United States Patent [19]

Kraus

[11] Patent Number: 4,844,236

[45] Date of Patent: Jul. 4, 1989

[54] INCLINED VIBRATORY CONVEYOR

[75] Inventor: Richard B. Kraus, Barrington, Ill.

[73] Assignee: General Kinematics Corporation, Barrington, Ill.

[21] Appl. No.: 170,100

[22] Filed: Mar. 11, 1988

Related U.S. Application Data

[63] Continuation of Ser. No. 73,384, Jul. 13, 1987, abandoned, which is a continuation of Ser. No. 899,785, Aug. 22, 1986, abandoned, which is a continuation of Ser. No. 819,976, Jan. 13, 1986, abandoned, which is a continuation of Ser. No. 746,442, Jun. 19, 1986, abandoned, which is a continuation of Ser. No. 657,049, Oct. 8, 1984, abandoned, which is a continuation of Ser. No. 368,859, Apr. 15, 1982, abandoned.

[51] Int. Cl.⁴ ....................... B65G 15/42; B65G 27/00

[52] U.S. Cl. .................................. 198/690.2; 198/771

[58] Field of Search ............. 198/771, 688.1, 750–755, 198/758–772, 690.2, 699.1

[56] References Cited

U.S. PATENT DOCUMENTS

| | | | |
|---|---|---|---|
| 1,971,292 | 8/1934 | Brauer | 198/771 |
| 2,725,984 | 12/1955 | Klemencic | 198/771 |
| 2,833,389 | 5/1958 | Bergmann | 198/755 X |
| 3,086,008 | 4/1963 | Opila et al. | 198/771 |
| 3,116,819 | 1/1964 | Katz | 198/771 |
| 3,455,436 | 7/1969 | Berke | 198/751 X |
| 3,667,590 | 6/1972 | Mead | 198/771 |
| 3,989,227 | 1/1976 | Musschoot | 198/755 X |
| 4,068,029 | 1/1978 | Armstrong | 198/771 |

FOREIGN PATENT DOCUMENTS

| | | | |
|---|---|---|---|
| 502631 | 5/1951 | Belgium | 198/772 |
| 245245 | 1/1926 | United Kingdom | 198/772 |

*Primary Examiner*—Robert J. Spar
*Assistant Examiner*—D. Glenn Dayoan
*Attorney, Agent, or Firm*—Wood, Dalton, Phillips, Mason & Rowe

[57] ABSTRACT

A vibratory conveying apparatus is provided with an improved V-shaped trough which conveys material up an inclined path. The angled walls of the trough enhance the frictional forces between the particles of material which, when combined with the frictional forces between the walls and the material, increases the ability of the material to be efficiently conveyed up an inclined path. The trough has a surface with a high coefficient of friction which aids in the conveying action. The higher coefficient of friction may be obtained by the type of material used for the surface of the trough or may be obtained by providing corrugating, ribbing or the like on the surface. The conveying action with the V-shaped trough also abraids the material so as to clean and process the material.

13 Claims, 2 Drawing Sheets

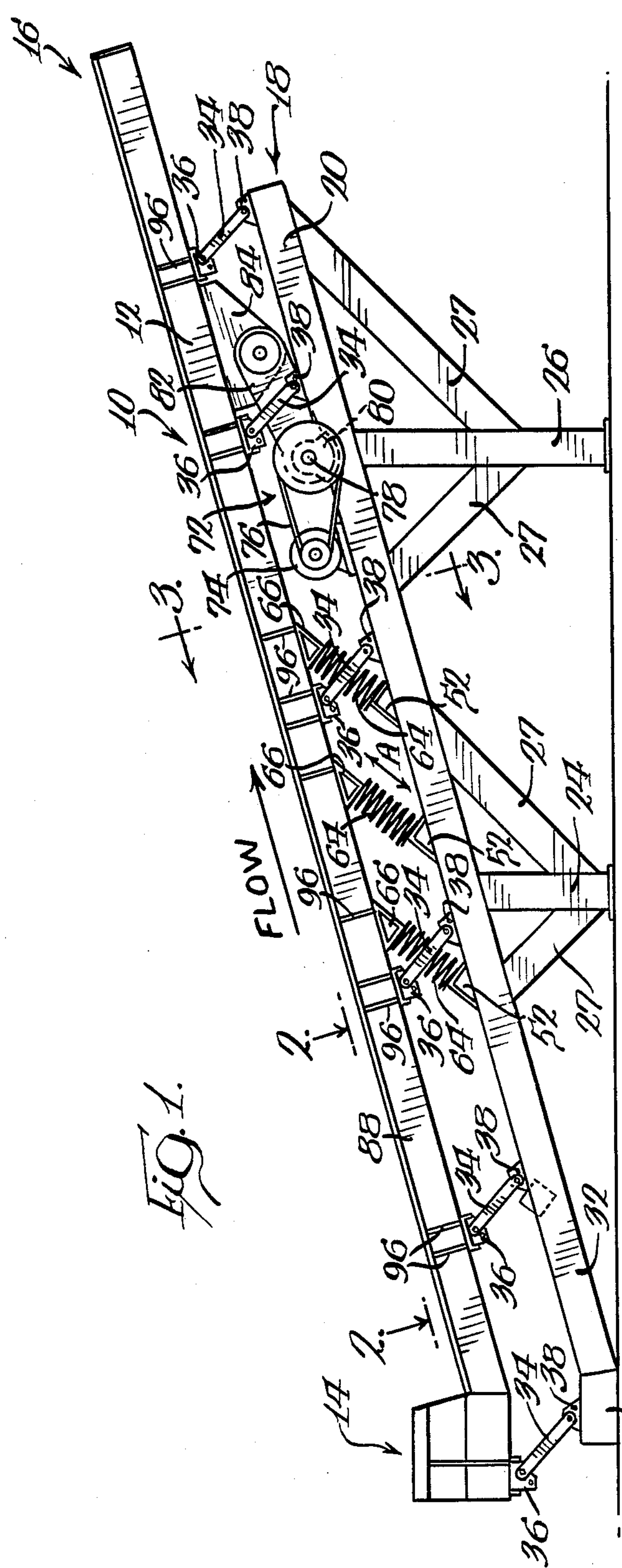
FLOW
Fig. 1.
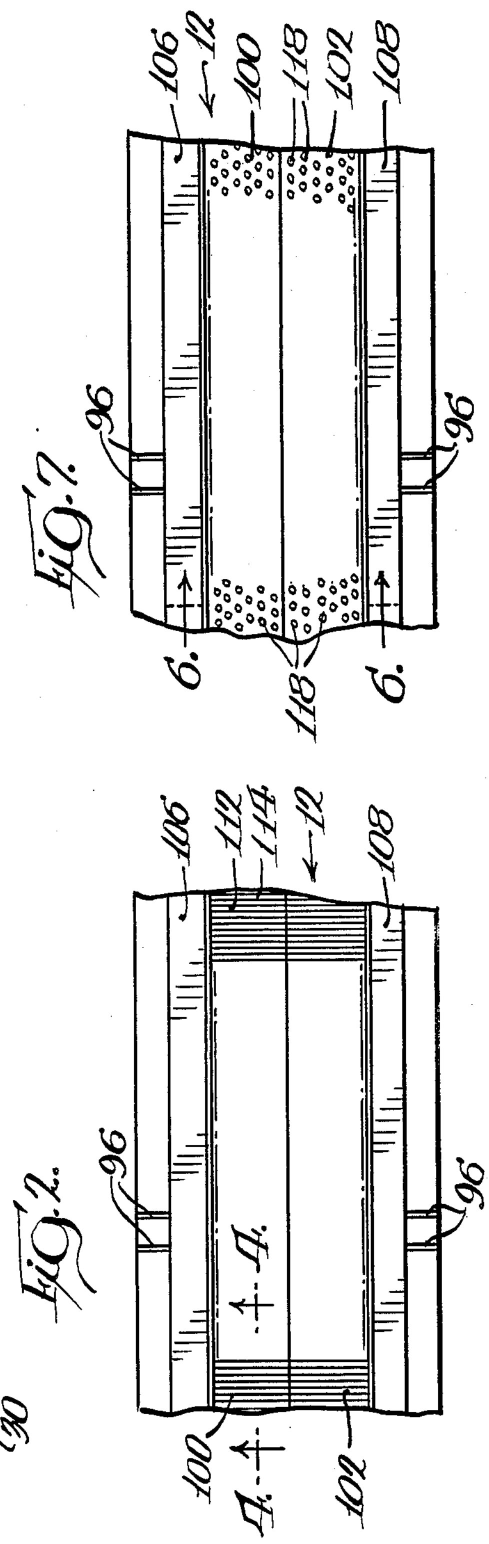
Fig. 2.
Fig. 7.

12
106
104
108
110
110
92
88
94
96
96
B
102
90
86
100
98
66
36
36
34
34
64
64
38
52
18
22
20

112
114
111
100

116
116
100

110
92
94
96
88
90
96
100
102
86

INCLINED VIBRATORY CONVEYOR

This application is a continuation of application Ser. No. 073,384, filed 7/13/87, which is a continuation of Ser. No. 899,785 filed 8/22/86 which is a continuation of Ser. No. 819,976 filed 1/13/86 which is a continuation of Ser. No. 746,442 filed 6/19/85, which is a continuation of Ser. No. 657,049 filed 10/3/84 which is a continuation of Ser. No. 368,859 filed 4/15/82 all abandoned.

TECHNICAL FIELD

This invention relates to vibratory conveying apparatus and more particularly to inclined vibratory conveyors for conveying material from one level to a higher level.

BACKGROUND OF THE INVENTION

Vibratory conveyors for conveying material up an inclined path have been known and used for many years. In the usual type inclined vibratory conveyor, it was not generally possible to convey material up an incline of more than 8° to the horizontal. The material conveyed is moved ahead along the trough by a series of gentle throws and catches created by a controlled linear motion produced by the eccentric drive and stabilized by the stabilizer links. The material is thus conveyed from one end of the trough to the other by the conveying action. For most of the travel the material is airborne, striking the material carrying surface only long enough to be relaunched into the air in the direction of the discharge end of the conveyor. The vibratory conveying action has been used not only for conveying material or parts from one end of the trough to the other but can simultaneously perform other functions such as the removal of sand from castings because of the jarring or impacting nature of the vibratory conveying motion. An example of an apparatus of the type described may be found in the Musschoot patent, U.S. Pat. No. 3,335,861.

As can be visualized, limitation on the angle of incline up which the material may be conveyed, is created somewhat by the size of the throw of the conveying action. That is, if the incline is steeper than the height of the throw, the material will not advance up the incline, but will remain stationary relative to the trough or may even move in the opposite direction.

There are many jobs where floor space is limited so that a long gradual incline for moving material or parts from one level to another is not possible. Many of the jobs also require that the parts be oriented when they arrive at the higher level. Current conveying systems are deficient in one or the other or both requirements, or if they are tailored to do the job, they are expensive to build and to maintain.

SUMMARY OF THE INVENTION

The present invention provides an inclined vibratory conveying apparatus whereby the conveying action, together with the special construction of the trough, will permit conveying material up an incline in excess of 20° from the horizontal. The improved conveying apparatus includes a trough which is V-shaped in cross-section along a plane transverse to the longitudinal axis of the conveyor. The walls of the V-shaped trough will create a frictional force between particles of the materials or elements being conveyed, which frictional force combines with the friction between the particles and the walls such that the throws of the vibratory conveying action will move the parts up the incline of the trough. It has been found that increasing the angle of the walls of the trough relative to each other will increase the frictional forces between the walls and the particles, thereby increasing the upward conveying action of the apparatus.

Large particles, when conveyed in the angled V-shaped trough, will touch both sides of the V to come under the influence of the frictional forces which act to convey the large particles when vibrated on the vibratory conveyor. A mass or bed of particles in which each particle is too small to touch both walls, interacts with other particles which in turn interacts with the V-shaped sides to receive the frictional forces for conveying the mass or bed of particles under the vibratory conveying action.

Providing the inclined walls of the trough with liners or roughened surfaces will increase the friction between the trough and the parts, thereby providing a more positive throw to the conveying portion of the conveying action, and thereby increasing the rate and angle of the conveying action of the apparatus.

Different surfaces on the walls of the V-shaped trough accomplish different results so that providing knobs in a waffle pattern will not only contribute to the upward conveying action, but also will serve to scrub the surface of the parts producing a cleaner part at the discharge end of the conveyor. The surfaces of the inclined walls of the V-shaped trough could be grooves which are parallel to the trough, angled to the trough or at right angles to the longitudinal axis of the trough, each one accomplishing an improved conveying action for a particular set of circumstances.

The V-shaped trough has been found particularly useful, for instance, for conveying cylinders up an incline, which in the process of conveying, will also orient the cylinders in the same pattern. Even irregular castings will be oriented in a particular pattern. When the V-shaped conveyor has been used on small parts, it will convey the small parts as bulk material and will move the small parts up the incline to the discharge end of the conveyor.

DESCRIPTION OF THE DRAWINGS

FIG. 1 is a side elevational view showing an inclined vibratory conveyor apparatus of the present invention;

FIG. 2 is a top view taken along the lines 2—2 of FIG. 1;

FIG. 7 is a cross-sectional vertical view taken along the lines 7—7 of FIG. 6.

DESCRIPTION OF THE PREFERRED EMBODIMENT

Figure 3:
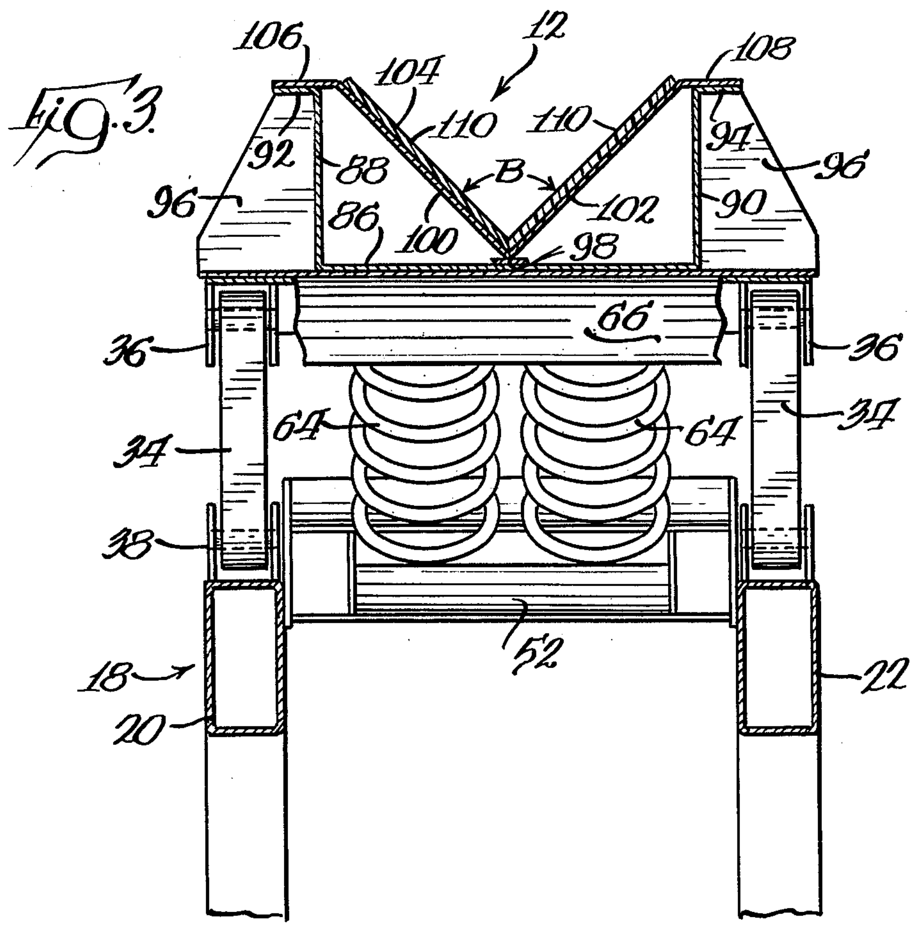
FIG. 3 is an enlarged vertical sectional view along the lines 3—3 of FIG. 1.

Referring to the drawings and in particular to the conveyor apparatus illustrated best in FIGS. 1 and 3, an inclined vibratory conveyor apparatus 10 is illustrated and includes a material carrying trough 12 extending from a loading station 14 to a discharge station 16. A base member 18, which includes a pair of spaced apart side beams 20 and 22 (FIG. 3) is supported in an inclined attitude by fixed supports 24 and 26 which are anchored to a floor or supporting surface 28. An anchor block 30 is rigidly anchored to the surface 28 and is rigidly attached to the lower end portion 32 of the base member 18. The supports 24 and 26 have angled support arms 27 fastened thereto and extending up and into rigid contact with the side beams 20 and 22. The base 18 and anchor block 30 are connected to the trough 12 by means of a plurality of links or arms 34 which are pivotally connected at one end to brackets 36 carried by the trough 12 and at the other end to brackets 38 carried respectively by the anchor block 30 and base member 18.

A plurality of springs 64 are mounted between cross-braces 52 on the base 18 and mounting brackets 66, carried by the underportion of the trough 12. Each spring 64 has an axis lying generally parallel to the direction of the vibratory movement of the conveyor as will be described more fully hereinafter. A drive system generally designated 72 is provided for imparting vibratory movement to the material carrying member or trough 12, which system includes an electric motor 74 carried by the base 18 and connected by a belt 76 to drive a shaft 78 carried by the base 18 and to which shaft 78 eccentric weights 80 are drivingly connected. The shaft 78 is drivingly connected to connecting rods 82 which in turn are connected to brackets 84 carried by the trough 12 so as to provide vibratory conveying motion to the trough 12. The particular form of vibration imparting system is not a part of the present invention and thus such vibrating means will not be further described herein. An example of a typical vibrating system 72 is shown in Musschoot U.S. Pat. No. 3,750,866, assigned to the common assignee of the present application.

The apparatus hereinabove described, when operated, will produce vibrations in the trough, generally along the line A in FIG. 1, thereby to produce the movement of the conveyor and to create the throw and catch of the material along the trough.

The present invention contemplates particularly a relatively steep inclined angle for the trough 12 and a V-shaped configuration in cross-section for the trough. As an example, the trough 12, as shown in cross-section in FIG. 3, comprises a plate 86 having upwardly extending side flanges 88 and 90 spaced an equal distance on each side of the centerline of the trough 12. To add rigidity to the trough, the flanges 88 and 90 may have outwardly disposed ledges 92 and 94 respectively, with a plurality of gusset plates 96 spaced at appropriate intervals throughout the lengths of the plate on either side of the trough. As best shown in FIG. 1, the gusset plates 96 would most advantageously be located in the vicinity of the brackets 36 and 66 so as to provide support therefor. The trough 12 has side walls 100 and 102 converging downwardly to an apex 98 along the centerline of the trough 12. The side walls 100 and 102 form the material carrying portion 104 of the trough 12 and have flanges 106 and 108 respectively, extending horizontally into secured engagement with the ledges 92 and 94 of the flanges 88 and 90. It is to be understood that any appropriate trough construction is acceptable as long as it provides a supporting structure for the novel V-shaped material carrying member.

Appropriate lining material or liners 110 may be provided on the conveying surface of the walls 100 and 102. The liners 110 may consist of roughened surfaces of the walls 100 and 102, or may be separate material having a surface with a high coefficient of friction or having a roughened exposed surface to increase the friction between the conveying portion 104 of the trough and the material being conveyed. One advantage to using replaceable liners 110 is that when wear becomes excessive, they can be replaced relatively easily without excessive down time for the equipment. The trough is referred to as V-shaped in cross-section with the two walls 100,102 lying in planes forming an included angle B therebetween. The walls 100,102 could have slight bows in or out as long as the general planes of the walls 100,102 form a V in cross-section. The walls 100,102 intersect along a line coinciding with the apex 98, which line lies parallel to the longitudinal axis of the trough. As shown in FIG. 3, the walls 100 and 102 form angles with the horizontal of approximately 45° so that the included angle B in the conveying portion 104 of the trough is approximately a right angle, it being understood that the angles of the walls with respect to the horizontal can be varied so as to vary the included angle B between the walls 100 and 102.

Figure 4:
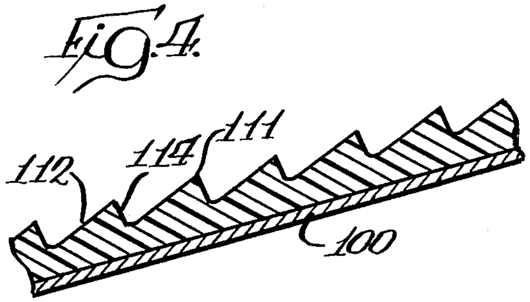
FIG. 4 is a sectional view of the liner of the trough taken along the lines 4—4 of FIG. 2.
Figure 5:
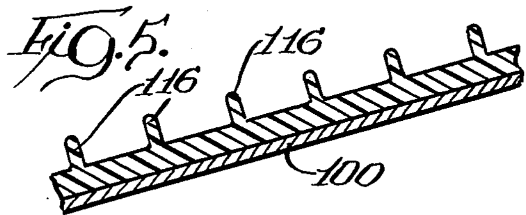
FIG. 5 is a view similar to FIG. 4 only showing a different surface configuration on the liner of the trough.
Figure 6:
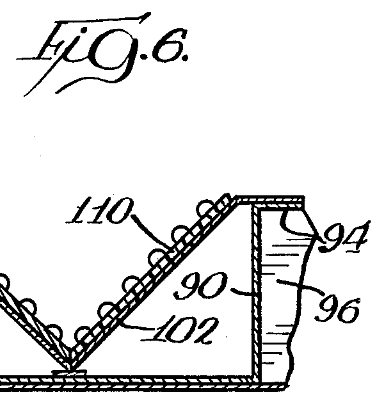
FIG. 6 is a top view taken substantially along the line 2—2 of FIG. 1, only showing a modified form of liner in the trough.

Various modified surface configurations and textures have been found to be advantageous and a few are illustrated herein. FIGS. 2 and 4 show inclined ribs extending along planes parallel to each other, which planes are transverse to the longitudinal axis of the trough. As shown in FIG. 4, the individual ribs 111 may be in the form of saw teeth with each tooth having one inclined leg 112 which is longer than a vertical leg 114. Another modified surface is shown in FIG. 5 wherein spaced apart vertical ribs 116 lie in planes which are parallel to each other and are perpendicular to the longitudinal axis of the trough. FIGS. 6 and 7 show still a further modified surface of the trough, wherein a plurality of dimples or lugs 118 are formed on the surface of the liners 110, with each individual dimple or lug 118 being located randomly with respect to all other dimples or lugs, but with the lugs or dimples 118 being spaced apart a sufficient distance to provide both a frictional surface and an abrading surface for the material being conveyed. The lugs 118 provide a maximum frictional surface with the material being conveyed and urge the particles of the material together to further enhance the conveying action.

INDUSTRIAL APPLICATION

The vibratory conveyor 10 having the improved V-shaped material carrying trough 12 will move material up an incline angled in excess of 20° to the horizontal thereby shortening the amount of floor space required for the apparatus and at the same time providing a cleaning and orienting action for discrete particles of the material being conveyed.

There is a practical limit beyond which the included angle B between the walls 100 and 102 can no longer function efficiently. That is, when the frictional forces between the particles of material being conveyed and the trough is greater than the vertical component of acceleration of the vibratory motion, the particles will become wedged between the walls 100,102 of the trough and no conveying action will take place. In other words, the conveying force is not enough to overcome the frictional forces between the particles and the conveying surfaces.

It has been found that when the particles are of a particular size and are substantially similar in outside configuration and weight distribution, the action involved in conveying the parts from the input to the output end of the conveyor will not only convey the parts but will also orient the parts into a uniform order at the discharge end of the conveyor. For example, cylindrically shaped articles will contact the trough walls along lines lying parallel to the longitudinal axis of the trough.

It has also been found that a V-shaped inclined trough will not only convey material made up of large particles (i.e. cylinders) but also it will convey material made up of a mass or bed of small, discrete particles. The small, discrete bed of particles will be conveyed as bulk material with each particle bearing against the adjacent particles to create frictional forces therebetween which, when combined with the frictional forces created by the wedging action of the sloped walls 100,102 on the particles, will result in a highly effective conveying action when subjected to the vibratory conveying motion of the vibratory conveyor.

Using surface configurations such as shown in FIGS. 4, 5 and 7 will not only convey the material but also will abrade the material so that when the material arrives at the discharge end, many rough edges and most of any loose sand adhering to the particles of material will have been abraded off.

I claim:

1. In a vibratory conveyor, an elongated material-carrying member having a longitudinal axis inclined upwardly from a loading end to a discharge end, a base, means for supporting the material-carrying member relative to the base, means for vibrating the material-carrying member to convey material up the incline of the material-carrying member, characterized by said material-carrying member having a trough which is V-shaped in cross-section and having spaced upper edges, a pair of planar elongate walls forming said V-shaped cross-section of said trough, the planes of said walls extending angularly with respect to each other and intersecting each other along a line parallel to the longitudinal axis of the material carrying member and having an included angle of less than 110° and said line forming the intersection of said planar walls and said longitudinal axis of said material carrying member forming an angle with the horizontal of at least 18 degrees.

2. In a vibratory conveyor as claimed in claim 1 wherein each of said walls has a conveying surface with a relatively high coefficient of friction.

3. In a vibratory conveyor as claimed in claim 2 wherein each of said walls has a liner affixed to the surface thereof, said liners having a relatively high coefficient of friction.

4. In a vibratory conveyor as claimed in claim 1 wherein the trough forms an angle to the horizontal in excess of 20° and said walls define an included angle of less than 90° therebetween.

5. In a vibratory conveyor as claimed in claim 1 wherein the V-shaped trough has a conveying surface and wherein the conveying surface has a plurality of rigid, spaced apart means laying in planes parallel to each other and extending transverse to the longitudinal axis of the material-carrying member.

6. In a vibratory conveyor as claimed in claim 5 wherein said spaced apart means are sawtooth shaped protrusions, each protrusion having a substantially vertical leg extending outwardly from the bottom of the trough.

7. In a vibratory conveyor as claimed in claim 5 wherein said spaced apart means are rib-shaped members, each rib-shaped member extending from side to side of the trough along said parallel planes.

8. In a vibratory conveyor as claimed in claim 1 wherein each wall has a plurality of randomly positioned spaced apart lugs projecting from the surface of the wall into the space between the walls of the trough.

9. A vibratory conveyor comprising an elongated material-carrying member having a longitudinal axis inclined upwardly from a loading end to a discharge end, a V-shaped trough on said material-carrying member having two planar wall portions defining spaced upper edges and intersecting along a line generally parallel to the longitudinal axis of the material-carrying member, said two planar wall portions defining an included angle of approximately 90° for receiving material to be conveyed, the V-shaped trough on the material-carrying member and the base being inclined to the horizontal at an angle of at least 18 degrees, a base, a plurality of legs pivotally mounted on the material-carrying member and the base for supporting the material-carrying member on the base, a plurality of force transmitting springs extending from the base to the material-carrying member along an axis substantially perpendicular to the legs, and means for vibrating the material-carrying member to convey material up the incline of said V-shaped trough.

10. A vibratory conveyor as claimed in claim 9 wherein liner means are attached to said planar wall portions and means on said liner means contact said material to increase the conveying action of said trough.

11. A vibratory conveyor as claimed in claim 10 wherein said last named means on said liner means are ribs extending transverse to the longitudinal axis of the trough.

12. A vibratory conveyor as claimed in claim 10 wherein said last named means on said liner means are saw-tooth shaped protrusions extending transverse to the longitudinal axis of the trough.

13. A vibratory conveyor as claimed in claim 10 wherein said last named means on said liner means are plural, rigid lugs randomly situated throughout the surface of said liner means.

* * * * *